(12) United States Patent
Neary

(10) Patent No.: US 6,532,745 B1
(45) Date of Patent: Mar. 18, 2003

(54) PARTIALLY-OPEN GAS TURBINE CYCLE PROVIDING HIGH THERMAL EFFICIENCIES AND ULTRA-LOW EMISSIONS

(76) Inventor: David L. Neary, 711 Manchester Trail Dr., Spring, TX (US) 77373

(*) Notice: Subject to any disclaimer, the term of this patent is extended or adjusted under 35 U.S.C. 154(b) by 0 days.

(21) Appl. No.: 10/119,915

(22) Filed: Apr. 10, 2002

(51) Int. Cl.[7] .............................. F02C 3/34; F02C 6/06
(52) U.S. Cl. ....................................... 60/784; 60/39.52
(58) Field of Search ...................... 60/784, 785, 39.52, 60/39.41, 737

(56) References Cited

U.S. PATENT DOCUMENTS

| | | | | |
|---|---|---|---|---|
| 2,303,381 A | * | 12/1942 | New ........................ | 60/39.52 |
| 2,482,791 A | * | 9/1949 | Nettel et al. ............. | 123/193.3 |
| 2,541,532 A | * | 2/1951 | Mosser ...................... | 60/39.52 |
| 3,077,737 A | * | 2/1963 | Silvern ...................... | 60/39.52 |
| 3,949,548 A | | 4/1976 | Lockwood, Jr. | |
| 4,426,842 A | * | 1/1984 | Collet ........................ | 60/39.52 |
| 4,434,613 A | * | 3/1984 | Stahl ......................... | 60/39.52 |
| 4,498,289 A | * | 2/1985 | Osgerby ..................... | 60/39.52 |
| 4,502,277 A | | 3/1985 | Papastavros | |
| 4,528,811 A | | 7/1985 | Stahl | |
| 4,841,721 A | | 6/1989 | Patton et al. | |
| 5,678,408 A | | 10/1997 | JaNES | |
| 5,724,805 A | | 3/1998 | Golomb et al. | |
| 5,881,549 A | | 3/1999 | Janes | |
| 6,260,348 B1 | * | 7/2001 | Sugishita et al. ........... | 60/39.52 |
| 6,269,624 B1 | * | 8/2001 | Frutschi et al. ............ | 60/39.52 |
| 6,289,666 B1 | | 9/2001 | Ginter | |
| 6,298,654 B1 | * | 10/2001 | Vermes et al. ............. | 60/39.41 |
| 6,363,708 B1 | * | 4/2002 | Rakhmailov ............... | 60/39.41 |

FOREIGN PATENT DOCUMENTS

| | | | | |
|---|---|---|---|---|
| FR | 1158344 | * | 6/1958 | ................. 60/39.52 |
| IT | 446244 | * | 3/1949 | ................. 60/39.52 |
| SU | 158752 | * | 12/1962 | ................. 60/39.52 |

OTHER PUBLICATIONS

Lefebvre, A.H. et al., "Gas Turbine Combustion," 2nd Edition, 1998.
Glassman, I. et al., "Combustion," 2nd edition, 1986.
Gas Processors Association, Engineering Data Book, 11th edition, 1998.
Reed, R.D., "Furnace Operations," 3rd edition, 1981.
NIST/EPA Gas–Phase Infrared Database, Feb. 2000.

* cited by examiner

*Primary Examiner*—Ted Kim

(57) ABSTRACT

A partially-open turbine cycle for use with a modified gas turbine wherein the cycle's working motive fluid replaces the predominant air-derived nitrogen working motive fluid contained in a conventional gas turbine cycle. The working motive fluid comprises a mixture of predominantly carbon dioxide and water vapor in a Mol percent ratio identical to that of the same molecular components Mol percentage as generated from the combustion of the fuel used. The cycle's is susceptible to a 98 percent reduction of fugitive nitrogen oxide and carbon monoxide mass flow emissions as emitted by present art gas turbines on a rated shaft-horsepower basis, and is further susceptible to high simple cycle and cogeneration plant thermal efficiencies at greatly reduced operating pressures.

13 Claims, 1 Drawing Sheet

PARTIALLY-OPEN GAS TURBINE CYCLE PROVIDING HIGH THERMAL EFFICIENCIES AND ULTRA-LOW EMISSIONS

BACKGROUND OF THE INVENTION

When Brayton Simple Cycle gas turbines operate as mechanical power drive sources to electric generators and other mechanically driven devices, atmospheric air is compressed and mixed with hydrocarbon gases or atomized hydrocarbon liquids for the resulting mixture's ignition and combustion at constant pressure. To produce power, the hot combustion and working motive fluid gases are expanded to near atmospheric pressure across one or more power extraction turbine wheels, positioned in series.

The majority of Brayton simple open-cycle aeroderivative-style Low-$NO_x$ art gas turbines are predominantly presently limited in achieving shaft output horsepower rating with 34 to 36% thermal efficiencies, whereas most simple cycle industrial-style Low-$NO_x$ art gas turbines are predominantly presently limited in achieving shaft output horsepower rating with 37 to 40% thermal efficiencies. These higher efficiencies are achieved when the gas turbines operate with compressor ratios ranging from 18 to 26 and predominant power turbine inlet temperatures ranging from 180° to 2300° F.

Existing gas turbines employ combustion chamber air/fuel combustion chemical reactions, wherein the elements of time and high peak flame temperatures increase the presence of disassociation chemical reactions that produce the fugitive emissions of carbon monoxide (CO) and other chemical reactions that produce nitrogen oxides ($NO_x$).

The best available applied turbine low-nitrogen oxide combustion technology for limiting gas turbine $NO_x$ emissions, using stiochiometric air/fuel primary combustion reaction chemistry means, still results in the production of over one million pounds a year of fugitive emissions, when a 100 megawatt gas turbine facility operates continuously. Such emissions of $NO_x$ and CO are no longer acceptable for new power facilities being built in numerous states and metropolitan environmental compliance jurisdictions, particularly for the more economically popular sizes of 400 MW to 1200 MW power generation plants.

With the conventional gas turbine's use of compressed atmospheric air as a source of oxygen ($O_2$), which acts as a fuel combustion oxidizer reactant, nitrogen ($N_2$) is the 78.1% predominant mass component within the cycle's working motive fluid. Due to its diatomic molecular structure, the nitrogen molecules are capable of absorbing combustion heat only through convective heat transfer means resulting from their collisions with higher temperature gas molecules or higher temperature interior walls of the combustion chamber.

Despite the very brief time it takes a conventional cycle to reach a molecular primary flame combustion zone gas equilibrium temperature of less than 2600° F. to 2900° F. within the combustion chamber, there are sufficiently excessive high flame temperatures and ample time for a portion of the highly predominate nitrogen gas to enter into chemical reactions that produce nitrogen oxides. The same combined elements of time and sufficiently excessive high flame temperature permit carbon dioxide to enter into dissociation chemical reactions that produce carbon monoxide gas.

To achieve a goal of greatly reducing a turbine cycle's fugitive emissions without sacrificing simple and cogeneration power thermal efficiencies, it is necessary to alter both the fuel combustion chemical reaction formula and the means by which acceptable combustion flame temperatures can be precisely maintained within the turbine combustor. Maintenance of an acceptably low fuel combustor gas temperature requires a change in the means by which the heat of combustion can be better controlled and more rapidly distributed uniformly throughout the gases contained within the fuel combustor.

It has been well known and practiced for decades that higher humidity air and injected water or steam in the presence of conventional air working motive fluid increases combustion flame speeds and fuel combustion thermal efficiencies within gas turbines and other apparatus using air/fuel combustion. It has also been well known and practiced that partially re-circulating, combustion flue gases containing carbon dioxide back into a combustion chamber results in a reduced level of nitrogen oxides within the fuel combustion exhaust gases. Due to the high temperatures and speed of completed fuel combustion, the scientific community has been unable to reach a consensus as to precisely what series of altered chemical reactions occur when water vapor and/or carbon dioxide is introduced into a turbine combustion chamber.

Conventional gas turbines must be de-rated from their standard ISO horsepower or kW ratings at ambient temperatures exceeding 59° F., or at operating site altitudes above sea level. Thus, during summer's peak power demand periods, when the temperature rises to 95° F., a 19 to 22% horsepower deration of a conventional gas turbine's ISO rating occurs. It is desirable that a gas turbine cycle not be susceptible to such temperature deration.

Present gas turbines' high combustor operating pressures require a gas-pipeline source of 280 to over 550-psi gage pressure. If a manufacturing facility, process facility, or utility power generating facility has access only to a lower pressure source of natural a gas, then one or more high horsepower fuel gas booster compressors must be employed to raise the fuel supply pressure. It is therefore desirable that gas turbines be able to operate on fuel gas supply pressures of less than 100 psi gage.

SUMMARY OF THE INVENTION

To achieve ultra-low fugitive turbine exhaust emissions, the AES power cycle of the present invention employs a continuous controllable mass flow rate of recycled superheated vapor-state mixture of carbon dioxide ($CO_2$) and water vapor ($H_2O$), in identical mixture Mol percent proportions as each occurs as products of chemical combustion reactions from the gaseous or liquid hydrocarbon fuel employed.

Provided herein is a partially-open gas turbine cycle for use with modified gas turbines, preferably presently designed with a final stage of air compression that has radial means connected to one or more exterior-mounted turbine combustion chambers. The partially-open gas turbine cycle can also be used with alternative power cycle configurations that utilize existing mechanical equipment components which are not specifically designed for, nor applied to, the manufacture of current technology gas turbine systems.

The AES power cycle of the present invention provides a non-air working motive fluid means that reduces mass flow fugitive emissions by over 98% from that of conventional Low-$NO_2$ designed gas turbines.

The AES power cycle of the present invention offers means of controlling a combustor's internal temperatures to avoid the creation of fugitive turbine exhaust emissions.

The AES power cycle of the present invention offers the equivalent or higher thermal efficiencies than open simple-cycle gas turbines operating alone or within cogeneration power facilities. The AES simple-cycle is susceptible to 42.5% output shaft thermal efficiency and, which applied to a cogeneration system, the overall thermal efficiency may approach 100%.

The AES power cycle described herein has turbine compression ratios of 3.0 to 6.5 (3.0 to 6.5 bar operating pressure) with presented example cycle efficiencies at 60 psi absolute (3.12 bar).

The AES power cycle of the present invention offers high thermal efficiencies with turbine fuel gas supply pressures of less than 100 psi gage (7.9 bar).

The AES power cycle and power cycle equipment components described herein include the means by which its turbine power cycle and separately associated power plant auxiliaries are monitored and controlled for safe operation, as well as means of controlling working motive flows in response to changes in power demands. The combined turbine/recycle compressor and driven mechanical equipment safe operating and output functions are monitored and controlled by a turbine manufacturer's PLC based control panel design that meets or exceeds the American Petroleum Institute (API) specifications for industrial gas turbines (API 616) or aeroderivative gas turbines specification (API RP 11PGT) and may be further control-integrated with a power plant distributive control system (DCS). The individual auxiliary system modular component PLC control panel's operating output data signals are collectively control-integrated into the DCS together with the operating power cycle's operating data signals comprising but not limited to:

(a) the AES power cycle's individual valve controlled gas stream's mass flows with temperatures and pressures for a given operating hydrocarbon fuel composition and shaft horsepower output;

(b) the AES power cycle system turbine exhaust conditioning status and turbine exhaust excess oxygen content for a given operating hydrocarbon fuel composition;

(c) the AES power cycle's turbine exhaust and primary recycle compressor discharge mass flow rates through their respective downstream waste heat exchangers' plurality of parallel positioned heat exchanger sections;

(d) the cycle's power plant auxiliary rotating equipment's operating mass flow rates with temperatures and pressures combined with the positioning-state of any rotating equipment's integral capacity control apparatus.

An additional object of the present invention is to provide a turbine power cycle system that operates with a fuel gas supply pressure of less than 100-psi gage pressure.

It is a further object of this invention to provide the means wherein, during a steady-state power operation, the atmospheric vented and open cycle portion of the turbine exhaust mass flow is susceptible to being only 5.00% of the mass flow rate as contained within the closed portion of the turbine power cycle.

The following four embodiments comprise the subject matter of this invention:

First Embodiment

The working motive fluid of this invention's turbine power cycle system comprises a continuous superheated vapor mixture of predominant carbon dioxide ($CO_2$) and water vapor ($H_2O$) in identical Mol percent ratio proportions as the molecular combustion product components are produced from the combustion of the gaseous or liquid fuel utilized.

Within the predominately-closed portion of the cycle, the turbine exhaust gas is recycled from the turbine exhaust gas distribution manifold, the exhaust gas having a small degree of superheat temperature and positive gage pressure supply, to the inlet of the primary recycle compressor. This recycle compression function may be performed by a typical compressor used for air compression within a conventional gas turbine, or it may be a separate means-driven compressor of the axial, centrifugal, or rotating positive displacement type. Either means of compression incorporates means of flow control available within the compressor or by its driver, with flow changes being initiated by a master system control panel containing programmable microprocessors.

The compressor may increase the recycled turbine exhaust's absolute pressure by a ratio of only 3.0 to 6.5 to achieve a high simple-cycle thermal efficiency, but the cycle is not limited to operations within these said ratios.

As shown in Table 1, between gas turbine combustor pressures of 45 psia and 75 psia, the AES Cycle thermal efficiencies range between 35.16% and 43.24%. Between 75 psia and 90 psia combustor pressures (with the common primary recycle compressor and power turbine efficiencies of 84% and power turbine inlet temperature of 1800° F.), the AES cycle efficiency begins to decline.

TABLE 1

| Combustor Operating Pressure | Gas Turbine Gas Inlet Temperature | Gas Turbine Exhaust Temperature | Gas Turbine Net Output Horsepower | Gas Turbine Fuel Rate Btu/HP-Hr. | Thermal Efficiency %* |
| --- | --- | --- | --- | --- | --- |
| 45 psia | 1800 F. | 1471 F. | 2859 | 7237 | 35.16 |
| 60 psia | 1800 F. | 1391 F. | 3458 | 5983 | 42.54 |
| 75 psia | 1800 F. | 1331 F. | 3515 | 5885 | 43.24 |
| 90 psia | 1800 F. | 1284 F. | 3406 | 6075 | 41.89 |

*With a 1 Mol/minute methane gas fuel rate

The recycled turbine exhaust gas (hereafter referred to in the cycle fluid flow as "primary recycle gas") is discharged from the primary recycle compressor at an increased temperature and pressure through a manifold into two parallel branch conduit means, with the first branch conduit connected to a simple-cycle means included air-cooled heat exchanger, or alternatively to a cogeneration plant means included hot-gas-to-steam waste heat recovery exchanger. The second pressurized recycle gas branch conduit is connected to a counter-current flowing gas-to-gas heat exchanger. Within this exchanger, the high temperature recycle gas's heat may be transferred to a pressurized steam stream or to a predominant facility's process gas stream.

The primary recycle gas discharge flow from the two parallel-positioned heat exchangers (described above), is maintained at a slightly superheated vapor temperature at the selected operating pressure slightly above that of the selected internal combustor pressure. The primary recycle gas flows are discharged from the two parallel heat exchangers through their respective conduit branches of a common manifold conduit means, with each branch having a gas mass flow sensor means and a flow control damper valve.

The primary recycle gas is further conveyed through a common conduit means to the dual parallel inlet manifold of the primary section of a power turbine exhaust gas waste heat recovery unit (WHRU) exchanger. This power turbine exhaust gas WHRU exchanger is capable, with the particular example of a methane fuel combustion chamber pressure of 60 psi absolute and 1800° F. power turbine inlet temperature, of raising the temperature of the primary recycle gas within the turbine exhaust gas WHRU exchanger to a maximum 1350° F.; with these operating conditions and assumed compressor and turbine efficiencies of 84%, the desired cycle efficiencies of 42.5% are achieved. Thereafter, the highly superheated and pressurized recycle gas (hereafter referred to as "working motive fluid") is separately flow-divided for passage into one or more premixer and combustor assemblies.

Second Embodiment

From the First Embodiment's primary recycle turbine exhaust gas conduit routing means to the primary section of the power turbine exhaust WHRU, a portion of the total primary recycle low superheat gas is extracted from two separate branch connections on the conduit means. The first branch supplied portion of the extracted primary recycle gas is supplied to one or more premix assemblies. The second branch supplied portion of the extracted primary recycle gas is supplied to the inlet of a smaller secondary recycle compressor for an additional increase in pressure. This supply of further pressurized and after-cooled secondary recycle gas is routed to a venturi-style gas blender mounted near a power facility system's air separation unit. Within the venturi-style gas blender, the secondary compressed recycle gas stream is homogeneously blended with the highly predominant oxygen stream produced by a power facility system's air separation unit.

Third Embodiment

From the Second Embodiment's described blending of the recycle turbine exhaust gas and oxygen streams, the blended vapor mixture is routed by conduit means to the one or more turbine premixer sub-assemblies at a low temperature that is a few degrees above the dewpoint of the blended mixture. The Mol percents of the combined carbon dioxide and water vapor within the blended mixture acts as chemical reaction suppressant to potential self-ignition within the conduit means, in the event that the conduit's mixture inadvertently comes into contact with hydrocarbon containing foreign material.

Each combustor assembly may comprise one or more premix sub-assembly means into which the following streams are introduced: fuel; First Embodiment primary recycle gas; First Embodiment working motive fluid; and Second Embodiment combined recycle turbine exhaust gas and predominant oxygen stream, which originates from an adjacent facility containing an air separation modular system employing membrane air separation, cryogenic or pressure swing absorption method designs. These individual flow controlled conduit streams at differential pressures and velocities are collectively admitted through their respective premixer conduit means for homogeneous blending at their points of admittance into the primary combustion zone of each combustor assembly.

To establish primary combustion temperatures that do not exceed 2400° F., the first of two separately controlled mass flow streams of the highly superheated working motive fluid is directed from the turbine exhaust gas WHRU exchanger of the First Embodiment to the premixer with internal means providing for the division of the working motive fluid first stream for functions of: the homogeneous blending of the said motive fluid with fuel gas, predominant oxygen stream, and low superheat primary recycle within the immediate premixer interface area within the combustor; and the directed flow of secondary zone working motive fluid into the outermost flow annulus area surrounding the homogeneous mixture admitted into the combustor for ignition. The secondary zone working motive fluid admitted into the combustor thereby provides a closely positioned rapid heat-absorbing mass shrouding means around each primary zone combustion flame zone developed within the combustor immediately downstream from each premixer. This flame shrouding means enables the radiant heat energy emanating from the binary gas molecules within the flame to be rapidly distributed to and absorbed uniformly by the shroud's contained identical binary gaseous molecules at the speed of light-rate of 186,000 miles per second. The resulting equilibrium temperature within each combustor's primary and secondary zone, based on the controlled flow rate of the first stream of working motive fluid into the premixer, may be established as being equal to or less than 2400° F.

The second of two separately controlled mass flow streams of the highly superheated working motive fluid directed from the turbine exhaust gas WHRU exchanger is a working motive fluid tertiary flow of the First Embodiment. The tertiary flow may be introduced into the annulus area surrounding the inner combustor liner, followed by its flow emanation into the combustion chamber area through openings in the liner. This tertiary mass flow of highly superheated working motive fluid results in the lowering of the temperature of the final combustor exhaust to a maximum exhaust equilibrium temperature of 1800° F. to the power turbine assembly. The equilibrium temperature of the combustor exhaust gases is not limited to 1800° F., and may be controlled by the introduced tertiary mass flow rate to reach any other higher or lower selected operating temperature.

Within the power turbine assembly, the combustors' pressurized and highly superheated gases may be expanded to create useful work in the conventional form of both turbine output shaft horsepower and internal horsepower to additionally direct-drive the primary recycle compressor. In a conventional 2-shaft style of gas turbine, this primary recycle compressor is shaft-connected to the high-pressure section of the power turbine assembly and the low pressure section of the power turbine assembly provides the turbine power output power to driven equipment. The expanded exhaust gases exit the power turbine assembly at a small positive gage pressure, and are further conveyed to the inlet plenum chambers of the combined primary, secondary, and the optional auxiliary parallel-positioned sections of the turbine exhaust gas WHRU exchanger. The combined turbine exhaust gases exit the turbine exhaust gas WHRU exchanger's combined sections and are further collectively conveyed by manifold means to an air-cooled exchanger that further lowers the exhaust temperature to a controlled temperature level that is slightly above the dewpoint of the 0.5 to 1 psi gage pressure turbine exhaust. The turbine exhaust gases are then further routed to the turbine exhaust gas distribution manifold to complete the closed portion of the invention's partially open power cycle system.

Fourth Embodiment

From the Third Embodiment's predominately-closed portion of the cycle that is operating in a steady-state condition, excess turbine exhaust in its slightly superheated vapor state is vented from the turbine exhaust distribution manifold, thereby creating the open portion of the power cycle system. The mass flow rate in which the turbine exhaust is vented is essentially equivalent to the mass rate at which the water vapor and carbon dioxide products of combustion are formed within the power cycle system's one or more combustors. The cycle's vented excess turbine exhaust gas, during a steady-state partially open power cycle operation, is vented to the atmosphere.

Overall Cycle

With the partially-open gas turbine cycle power system described herein, fuel combustion means are susceptible to a 98% reduction of nitrogen oxides ($NO_x$) that occur in current art Low-$NO_x$ gas turbines. These same partially-open gas turbine cycle power system's fuel combustion means also suppress the chemical reaction dissociation formation of the fugitive emission carbon monoxide (CO) from carbon dioxide ($CO_2$). The means of suppressing fugitive emissions results from the following collective working fluid molecular attributes and combustion events:

(a) The working fluid of this invention's power cycle system comprises a continuous superheated mixture of predominant carbon dioxide ($CO_2$) and water vapor ($H_2O$) in identical Mol percent ratio proportions as these molecular components are produced from the combustion of a given fuel. For example, in the case of landfill gas, the working gas fluid contains a 1:1 ratio of 2 Mol carbon dioxide to 2 Mols water vapor in identical proportion to the products of stoichiometric oxygen combustion. The chemical reaction equation can be described as follows:

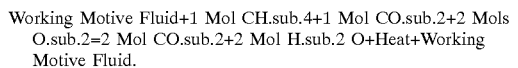

In the example of methane gas fuels, the working fluid composition contains a ratio of 1 Mol $CO_2$ to 2 Mols $H_2O$ in identical proportion to the products of 105% stoichiometric oxygen combustion of methane fuel within the chemical reaction equation of:

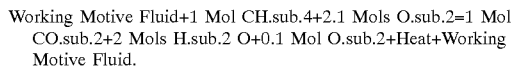

(b) The invention's turbine power cycle system's working fluid provides the replacement mass flow means to the conventional open Brayton simple cycle's predominant diatomic non-emissive and non-radiant energy absorbing molecular nitrogen ($N_2$) working fluid. The invention's replacement working motive fluid contains both predominant water vapor (with a binary lack of molecular symmetry) and a mass ratio of atomic weights of $(16/2)=8$ and carbon dioxide with a mass ratio of atomic weights of $(32/12)=2.66$, which denotes their susceptibility to high radiant energy emissivity and absorption. This compares to the nitrogen's mass ratio $14/14=1$ which denotes nitrogen's minimal, if any, emissive and radiant energy absorbing abilities at any temperature.

(c) The invention's turbine power cycle system's working motive fluid provides the means for a turbine combustion chemistry with a 900% increase of binary molecular mass means susceptible to the fuel/oxidation exothermic chemical reactions being highly accelerated at the speed of light (186,000 miles a second). This enables the complete and rapid combustion of gaseous or liquid hydrocarbon fuels through the absorption and emissive radiant heat transfer of the fuels' combustion product's superheated binary carbon dioxide and binary water vapor molecules' heat energy, that is emitted in the infrared spectral range identical to that of the working motive fluid.

(d) The Third Embodiment described combustor premixer assemblies providing means for homogeneous blending, wherein gaseous streams of working motive fluid and an oxygen-rich stream are further homogeneously blended with the gaseous fuel stream. The gaseous fuel stream also comprises binary molecules of high susceptibility to high radiant energy absorption and emissivity, such as methane with a mass ratio of atomic weights of $(16/4)=4$, ethane. with a mass ratio of atomic weights of $(24/4)=6$, propane with a mass ratio of atomic weights of $(36/8)=4.5$, etc.

(e) The subsequent tertiary zone admission of a controlled-flow of susceptible Table 1 identified 1350° F. superheated working fluid into the 2400° F. combined primary and secondary zones combustion gas stream, results in an almost instantaneous creation of the maximum desired equilibrium temperature of 1800° F. This rapid establishment of the preferred equilibrium temperature is due to the 186,000 miles per second rate of radiant heat transfer between the two streams of common molecular constituents with common means of high radiant energy absorption and emissivity. The extremely rapid rate at which the combustion product gases are lowered in temperature means there is no time for the chemical disassociation reactions, which produce carbon monoxide (CO), or other chemical reactions which produce nitrogen dioxide ($NO_2$), which may be produced in the presence of the highly elevated gas molecular temperatures above 2600 to 2900° F.

DETAILED DESCRIPTION OF THE PREFERRED EMBODIMENT

Figure 1:
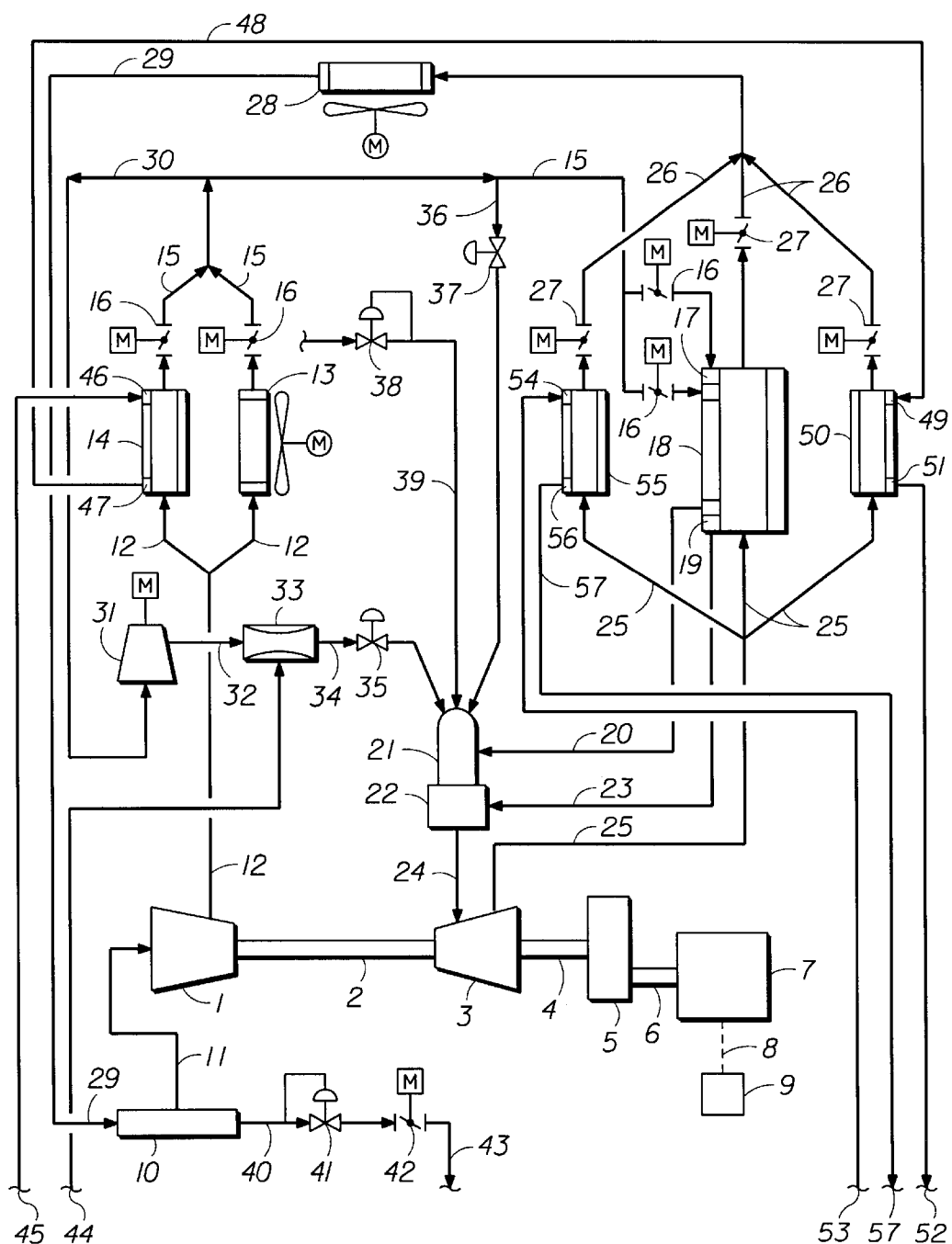
FIG. 1 is a schematic flow diagram of the invention's partially-open power turbine cycle.

Referring now more particularly to FIG. 1, the gas turbine's primary recycle compressor section 1 comprises a plurality of axial recycle gas compression stages, positioned in series, and a final stage radial directed discharge flow of compressed recycle gas. In the case of a two-shaft turbine, the power to drive the recycle compressor section 1 is transmitted by shaft 2, on which one or more high-pressure power turbine stages are mounted within the combustion gas expansion power turbine 3. The second shaft, designed for mechanical equipment drive applications, has one or more low-pressure gas expansion stages mounted on power output shaft 4, with coupling means for power transmission to rotate driven equipment.

The invention's cycle adaptation to conventional gas turbine driven mechanical equipment may or may not require the addition of a gearbox 5 to adapt the speed of the expansion power turbine 3 to the speed required by driven equipment (not shown). The rotating driven equipment may have its required power transmitted through a shaft and coupling means 6. The shaft and coupling means 6 may transmit power to generator 7, wherein electric power is produced and transmitted through conduit means 8 to a control room module 9. Control room module 9 therein contains the turbine PLC control panel and DCS panel, together with a switchgear and motor control center, whereby electric power production is controlled and distributed to the power facility's electrical grid and/or utility electrical grid. The shaft and coupling means 6 may alternately transmit power to other rotating pumps or compressors in lieu of generator 7.

Within the invention's partially-open simple cycle power system, the slightly superheated turbine exhaust recycle gas flows from the turbine exhaust gas distribution manifold 10 through turbine exhaust recycle gas conduit means 11 to the inlet of the primary turbine exhaust gas recycle compressor section 1. The higher-pressure and higher-temperature compressed recycle turbine exhaust gas (hereafter referred to as "primary recycle gas") exits primary recycle compressor 1 and is routed through conduit manifold 12 containing twin conduit end-branches. The first end-branch conduit is connected to a simple-cycle system provided air-cooler 13, or in the alternative, to a cogeneration system provided steam heat exchanger 13. The second end-branch of conduit manifold means 12 is connected to a counter-current flow gas-to-gas heat recovery exchanger 14. Within heat recovery exchanger 14, the high temperature primary recycle gas heat is transferred to a facilitiy's low temperature process gas or steam stream within conduit 45 that originates remotely from elsewhere within a facility and enters inlet manifold 46 of exchanger 14. The process gas or steam stream is increased in heat energy and discharged from the heat exchanger 14 discharge header 47 and flows through the series end-connected conduit 48 to the inlet manifold 49 secondary section 50 of the gas turbine exhaust gas waste heat recovery unit (WHRU) exchanger.

Each of the individual primary recycle gas discharge flows, one from each of the fore-described two parallel positioned recycle gas heat exchangers 13, 14, is routed through its respective manifold conduit 15 end branch, which contains a gas mass flow sensor means and a flow control (or proportioning) damper valve 16. The primary recycle gas is maintained at a small degree of superheated vapor temperature; it is routed through conduit 15 to parallel conduit and branch inlet connections on partitioned inlet-header 17 of the primary section 18 of the power turbine exhaust gas WHRU exchanger. Each parallel end branch contains a gas mass flow sensor means and flow control damper valve 16.

The primary recycle gas is additionally routed from manifold conduit means 15 through a first side-branch connected lesser flow conduit means 36 containing flow control valve 37 for subsequent conduit connection to one or more premixes sub-assemblies 21. The primary recycle gas is also routed from manifold conduit means 15 from a second side-branch connected conduit means 30 to the secondary recycle compressor 31 described herein.

The primary recycle gas exits in separate conduits from the parallel partitioned discharge header 19 of the primary section 18 of the power turbine exhaust gas WHRU exchanger at a high superheated temperature (with the recycle gas hereinafter referred as a "working motive fluid"). From the parallel partitioned discharge header 19 of the primary section 18 of the power turbine exhaust gas WHRU exchanger, the first end connected conduit means 20 supplies one or more premixer sub-assemblies 21 of one or more combustor assemblies 22 with the working motive fluid flow for the primary and secondary combustion zones within each combustor assembly 22. From the parallel partitioned discharge header 19 of the primary section 18 of the turbine exhaust WHRU exchanger, the second end connected conduit means 23 supplies the tertiary flow of working motive fluid into the tertiary gas-blending zone of each combustor assembly 22.

The Invention's power cycle system working motive fluid, combined with the combustion product gases developed within each combustor assembly 22, discharges from the combustor 22 through direct-connected means 24 to the power turbine 3.

The combustor's 22 integral premixer sub-assembly 21 is further supplied with a source of pressurized gaseous fuel that is pressure and flow regulated by control valve 38 through conduit means 39, as well as being supplied with a predominant oxygen containing gaseous mixture from control valve 35 within conduit means 34 that is end-connected to venturi gas blending assembly 33 for homogenous blending purposes.

After discharge from the combustor 22 and expansion in power turbine 3, the combined combustor exhaust gases (hereafter referred to as "turbine exhaust gas") enter turbine exhaust conduit 25 at a small positive pressure and high superheat temperature. The turbine exhaust conduit 25 may provide a plurality of inlet plenum connections to the turbine exhaust WHRU exchanger.

The parallel positioned sections of the power turbine's exhaust WHRU exchanger are the primary section 18, the secondary section 50, and the optional-auxiliary section 55. Conduit means 53 may optionally convey a cogeneration facility's low temperature process gas stream or steam flow into the gas inlet header 54 on the turbine exhaust gas WHRU exchangers optional auxiliary section 55. The process gas or steam is increased in temperature and exits the turbine exhaust gas WHRU exchanger's auxiliary section 55 through gas discharge manifold 56 for routing through conduit means 57 to the designated specific facility, steam circuit or process production applications requiring a pure source of highly superheated gas or steam.

The fore-described series end-connected discharge conduit 48 from the heat exchanger 14 header 47 conveys a flow of process gas or steam stream into the inlet manifold 49 of the secondary section 50 of the turbine exhaust gas WHRU exchanger. The process gas or steam stream is further increased in heat energy within the secondary section 50 and is discharged from the header 51 of the secondary section 50 into conduit 52, which is series end-connected to a cogeneration facility's process gas stream or steam system circuit.

The turbine exhaust gas exits the parallel positioned turbine exhaust gas WHRU exchanger sections and is routed through conduit manifold 26 containing three parallel outlet conduit branches, each containing a branch turbine exhaust mass flow sensor and flow proportioning damper valve 27. The conduit manifold 26 is further series end-connected to the inlet gas header on motor-driven air-cooled exchanger assembly 28. The turbine exhaust gas exits through the gas discharge header of exchanger assembly 28 at a controlled low superheat temperature and is further routed through end-connected conduit means 29 to the inlet connection on the turbine exhaust distribution manifold 10 for completion of the closed portion of the partially-open turbine cycle.

Referring again to the fore-described primary recycle compressor parallel positioned heat recovery exchangers' common discharge manifold 15 and the second side-branch connected conduit 30, which is series end-connected to the inlet of the secondary recycle compressor modular assembly 31, the secondary recycle compressor 31 increases the pressure and aftercools the lesser flow portion of the primary recycle gas that is extracted from the discharge manifold 15. The further compressed recycle gas is discharged from secondary recycle compressor 31 and is routed through conduit means 32 to the inlet of the fore-described venturi gas blending assembly 33.

From the low temperature superheated turbine exhaust gas mass flow entering the turbine exhaust distribution manifold 10 under a slight positive gage pressure, the cycle's excess turbine exhaust mass flow may be directly discharged to the atmosphere through said manifold's 10 series end-connected conduit means 40, which contains back pressure regulating valve means 41 and end means connection to open/closed positioned exhaust damper valve 42, which directs the excess exhaust to the atmosphere.

The numbers in Table 2 below are representative of one set of conditions in which the AES cycle is operating (the conduit streams are those identified by the numbers in FIG. 1). The following assumptions were made: the recycle compressor efficiency is 84%; the efficiency of the power turbine is 84%; the combustor operating pressure is 60 psia; and the methane fuel gas flow rate is 1 Mol/minute.

TABLE 2

| Conduit Stream Number | Stream Fluid | Temperature Degree F. | Pressure PSIA | Mass Flow lbs./Min. |
| --- | --- | --- | --- | --- |
| 11 | Recycle Exhaust | 196.5 | 15 | 1879 |
| 12 | Primary Recycle | 498 | 64 | 1879 |
| 20 | WMF - Primary | 1350 | 63 | 685.6 |
| 23 | WMF - Tertiary | 1350 | 63 | 1153.3 |
| 24 | Combustor Gas | 1800 | 60 | 1959 |
| 25 | Turbine Exhaust | 1391 | 15.8 | 1959 |
| 26 | Turbine Exhaust | 300 | 15.4 | 1959 |
| 29 | Turbine Exhaust | 200 | 15.1 | 1959 |
| 30 | Recycle | 280 | 85 | 24 |
| 32 | Recycle with AC | 290 | 85 | 24 |
| 34 | Recycle + $O_2$ | 167 | 65 | 90 |
| 36 | Recycle | 280 | 63.5 | 16 |
| 39 | Methane Fuel | 60 | 85 | 16 |
| 43 | Exhaust | 200 | 15 | 80 |
| 44 | Oxygen | 100 | 65 | 66 |

(WMF) = Working Motive Fluid

With the same conditions and assumptions made for Table 2, supra, Table 3 provides the thermal heat transfers and mass flow rates as contained in the four conduit streams (as noted) applicable to the heat exchangers identified.

TABLE 3

| Conduit Stream Number | Heat Exchanger Name | Stream Fluid | Temperature Change Degrees F. | Mass Flow lbs./Min. | Delta Enthalph Btu/Lb. | Heat Rate Btu/Min. |
| --- | --- | --- | --- | --- | --- | --- |
| 12 to 15 | 1st Recycle Section 13 & 14 | Recycle | 498 to 280 | 1879 | 70 | 131,530 Available |
| 25 to 26 | Section 18 | Exhaust | 1391 to 300 | 1959 | 402 | 787,518 |
| 25 to 26 | | Recycle | 280 to 1350 | 1959 | 393 | 719,049 |
| 25 to 16 | Secondary & Auxiliary Sections 50 & 55 | Steam or Process Gas | | | | 68,469 Available |

Total Available Heat for Process Gas or Steam Circuit = 131,530 + 68,469 equals 199,999 Btu/Min.-Mol Methane or 11,999,940 Btu/Hr-Mole Methane 11,999,940/20,693,400 LHV Btu/Mol CH4 - Hr. = 57.989%

With the same conditions and assumptions made for Table 2, supra, Table 4 provides the thermodynamic values from which the tabulated compressor horsepowers and turbine outputs are derived.

TABLE 4

| Conduit Stream Number | Rotating Equipment Name | Stream Fluid | Temperature Degrees F. | Mass Flow lbs./Min. | Delta Enthalph Btu/Lb. | Horse-Power (HP)* |
| --- | --- | --- | --- | --- | --- | --- |
| 11 to 12 | Recycle Compressor | Inlet Discharge | 197 498 | 1879 | 98.9 | 4377 |
| 22 to 25 | Power Turbine | Inlet Exhaust | 1800 1391 | 1959 | 169.7 | 7837 |

(*) Note:
Fuel Rate: 5980 Btu/Hp-Hr.; Shaft output thermal efficiency: 42.55%

While this invention has been described in its preferred embodiments, it is appreciated that variations may be made without departing from the scope and spirit of the invention.

I claim:

1. A partially-open gas turbine cycle for use with a modified gas turbine or comparable functioning turbine cycle train components producing mechanical output power and residual exhaust energy, the said cycle hereafter referred to as the AES Turbine Cycle comprising:

(a) AES Turbine Cycle working motive fluid and power turbine exhaust comprising a highly superheated mixture of predominant carbon dioxide and water vapor in Mol percent ratio proportions identical to that of the carbon dioxide and water vapor generated from combustion of the employed gaseous or liquid hydrocarbon fuel;

(b) a compressor means for raising the pressure of a low superheat recycled turbine exhaust gas stream, said stream of increased pressure recycled turbine exhaust gas hereafter referred to as the primary recycle gas stream;

(c) two or more primary recycle gas heat exchanger means conduit-positioned in parallel downstream from the said compressor means for extracting heat energy from the said primary recycle gas stream;

(d) said primary recycle gas heat exchanger means conduit manifold-connected to downstream positioned turbine exhaust gas waste heat recovery unit (WHRU) heat exchanger fluid manifold;

(e) said two or more heat exchangers downstream from the said compressor means, wherein the compressor's discharge gas heat contained within said primary recycle gas flow is transferred to air or to a facility's provided streams of process gas or steam, said compressor primary recycle gas flow being proportioned as required between plural exchangers by individual control valve means positioned within each said heat exchanger's parallel outlet branch's manifold conduit means;

(f) a turbine exhaust gas waste heat recovery unit (WHRU) heat exchanger means conduit-positioned downstream of a power turbine for transfer of power turbine exhaust gas residual heat energy to fluid coils contained within two or three parallel sections comprising said WHRU heat exchanger;

(g) a said WHRU heat exchanger collectively comprising a primary section containing parallel primary recycle gas stream coils as well as secondary and/or auxiliary sections containing steam or process fluid coils;

(h) conduit end-manifold parallel branches positioned downstream of said compressed recycle gas heat exchangers and containing individual control damper valve means for distributing the primary recycle manifold gas stream between parallel first and second primary recycle stream coils within the primary section of said WHRU heat exchanger, said parallel primary recycle gas stream coils discharging highly superheated first and second working motive fluid streams;

(i) conduit manifold branches and control damper valve means for distributing the power turbine exhaust gas mass flows between the said parallel sections of the said turbine exhaust gas WHRU heat exchanger, said manifold branch and damper control valve means connected to the downstream cool exhaust plenum sections side of said WHRU heat exchanger;

(j) manifold means for distributing said first flow-controlled stream portion of working motive fluid to one or more premixer subassemblies to establish a maximum temperature of primary and secondary zone combustion chemical reactions, said premixer subassemblies being direct means-connected to the exterior or interior of one or more combustion chamber assemblies, said manifold means positioned downstream of the fluid stream's said WHRU heat exchanger having a primary first stream discharge header;

(k) manifold means for distributing said second flow controlled stream portion of the said working motive fluid to one or more said combustor assemblies for establishing a reduced controlled temperature tertiary zone at outlets of the said combustor assemblies, said manifold means positioned downstream of the fluid stream's said WHRU heat exchanger having a primary section second stream discharge header;

(l) conduit and control valve means for distributing a predominant oxygen stream to one or more said premixer subassemblies; said conduit and valve means positioned upstream of said premixer subassemblies;

(m) conduit and control valve means for distributing pressurized gaseous or liquid hydrocarbon fuel to one or more said premixer subassemblies;

(n) one or more said combustor assemblies downstream from the said WHRU heat exchanger's primary section, said combustor assemblies comprising regions wherein the ignition and combustion chemical reactions occur, producing water vapor, carbon dioxide, and heat of combustion absorption by said working motive fluid;

(o) a power turbine assembly downstream of the said combustor assemblies for receiving the combustor gases predominantly comprising the working motive fluid and products of combustion at elevated temperature and pressure, the said combustor gases being expanded within said power turbine to produce mechanical output power and residual superheated exhaust gas heat energy;

(p) a power turbine assembly with output shaft series-train means of transmitting horsepower to drive rotating mechanical equipment or electrical generators with electric power conduit connections to a facility's control room containing generator switchgear and MCC modular cabinets;

(q) manifold or conduit series positioned means conveying the downstream superheated exhaust gases from the said power turbine through said turbine exhaust WHRU heat exchanger and series continuing thereafter to a final downstream conduit-positioned turbine exhaust heat exchanger creating a turbine exhaust gas temperature slightly above its dewpoint temperature;

(r) a turbine exhaust gas distribution manifold conduit-positioned downstream of the said final turbine exhaust heat exchanger, said heat exchanger conduit-routing a majority of the turbine exhaust mass flow to the inlet of the cycle's said compressor means, thereby completing the closed portion of said AES gas turbine cycle;

(s) conduit and control valve means for venting excess steady-state gas turbine exhaust mass flow from the said turbine exhaust gas distribution manifold into the atmosphere, said vented excess gas turbine exhaust providing the open portion of said AES gas turbine cycle wherein the said vented exhaust comprises a mass flow rate of low superheated temperature carbon dioxide and water vapor equating to the mass flow rate of the said AES gas turbine cycle's generated mass products of combustion;

(t) a master PLC control panel that exercises both safety monitoring functions and all control valves positioning in response to the said master control panel's coordination of both the AES Turbine Cycle's mechanical power output and fluid heat recovery demands imposed on the operating cycle.

2. A partially-open gas turbine cycle of claim 1, wherein a conduit manifold-connected means provides the fluid flow connection between the compressed recycle gas heat exchangers and the turbine exhaust WHRU heat exchanger, said conduit-connected means therein having lesser flow portions of the total primary recycle low superheat temperature gas that are extracted from first and second side-branch connections positioned upstream of said turbine exhaust WHRU heat exchanger, said first side-branch connection having end-connected conduit means wherein a control valve regulates a flow of compressed recycle gas to downstream-positioned one or more premixer assemblies, said second-branch connection having end-connected conduit means wherein a flow of compressed recycle gas is conveyed to the inlet of a secondary recycle compressor.

3. A secondary recycle gas compressor recited in claim 2, wherein the compressor type comprises that of a motor-driven low pressure ratio radial centrifugal or positive displacement modular designed compressor unit with motor speed-control design features.

4. A partially-open gas turbine cycle of claim 1, wherein a conduit and control valve means provides a regulated fluid flow stream distributing a predominant oxygen stream, said predominant oxygen stream comprising a venturi gas mixer produced homogeneous mixture of pressurized secondary recycle compressor discharge gas and a controlled rich oxygen stream supplied by a facility's separate auxiliary modular air separation system.

5. A partially-open turbine cycle of claim 1, wherein the recited cycle's compressor comprises one or more stages of axial or radial centrifugal or positive displacement design or combination of these design types thereof and direct-driven by the recited power turbine assembly or independently driven by other than said power turbine assembly.

6. A partially-open gas turbine cycle of claim 1, wherein the recited compressor means possesses compressor flow control means comprising shaft speed changes by the further recited power turbine assembly or by either the said compressor's internal flow control means or by separate variable speed drive means.

7. A partially-open gas turbine cycle of claim 1, wherein the recited conduit and control valve means for venting excess steady-state gas turbine exhaust to atmosphere, said control valve further performs a back-pressure control function to maintain the additionally recited turbine exhaust gas distribution manifold at a fixed desired internal absolute pressure.

8. A partially-open gas turbine cycle of claim 1, wherein one or more combustor assemblies and power turbine assembly have closely interconnecting conduit transition means or other means of one directly connecting to the another.

9. A partially-open gas turbine cycle of claim 1, wherein the power turbine assembly comprises one or more individual series-positioned hot gas expansion stages of conventional gas turbine axial flow design or alternative radial flow design.

10. A partially-closed gas turbine cycle of claim 1, wherein the power turbine assembly with output shaft series-train means therein further comprising shaft couplings and alternately gearbox means to adapt the power turbine assembly output shaft speed to the required speed of driven rotating mechanical equipment or electrical generators.

11. A partial-open gas turbine cycle of claim 1, wherein the primary recycle gas heat exchanger coil means has its heat absorbing fluid flow serially conduit-connected to the recited secondary section of the further recited turbine exhaust (WHRU) heat exchanger for cogeneration cycle applications and or to further recited final turbine exhaust heat exchanger series conduit-positioned downstream of the said WHRU.

12. A partially-open gas turbine cycle of claim 1, wherein flow controlling damper valves contained within turbine exhaust and primary recycle gas conduits are control-positioned as required by the further recited master PLC control panel upon receipt of mass flow data transmitted from computing sensor means positioned within the same said conduits.

13. A partially-open gas turbine cycle of claim 1, wherein the master PLC control panel comprising safety monitoring and control design features for both AES Turbine Cycle and driven mechanical rotating equipment applications are in accordance with API 616 or API RP 11PGT specifications, said master PLC control panel further comprising expandable control features for control integration with power cycle-complementing auxiliary systems' PLC control panels and a facility's power plant distributive control system (DCS).

* * * * *